United States Patent
Misumi

(10) Patent No.: US 9,807,433 B2
(45) Date of Patent: Oct. 31, 2017

(54) ENCODING SYSTEM AND ENCODER REALLOCATION METHOD

(71) Applicant: FUJITSU LIMITED, Kawasaki-shi, Kanagawa (JP)

(72) Inventor: Kenji Misumi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 522 days.

(21) Appl. No.: 14/488,470

(22) Filed: Sep. 17, 2014

(65) Prior Publication Data

US 2015/0003517 A1 Jan. 1, 2015

Related U.S. Application Data

(63) Continuation of application No. PCT/JP2012/057060, filed on Mar. 19, 2012.

(51) Int. Cl.
*H04N 21/2365* (2011.01)
*H04N 21/2383* (2011.01)
*H04N 21/24* (2011.01)

(52) U.S. Cl.
CPC ... *H04N 21/23655* (2013.01); *H04N 21/2383* (2013.01); *H04N 21/2404* (2013.01)

(58) Field of Classification Search
CPC .................................................. H04N 21/23655
See application file for complete search history.

(56) References Cited

U.S. PATENT DOCUMENTS 6,931,021 B1   8/2005   Enari et al.

FOREIGN PATENT DOCUMENTS

| JP | 11-27224 | 1/1999 |
|---|---|---|
| JP | 11-196399 | 7/1999 |
| JP | 2002-281528 | 9/2002 |
| JP | 2003-163912 | 6/2003 |
| JP | 2011-217137 | 10/2011 |

OTHER PUBLICATIONS

International Search Report mailed Jun. 26, 2012, in corresponding International Patent Application No. PCT/JP2012/057060.

*Primary Examiner* — James Pontius
(74) *Attorney, Agent, or Firm* — Staas & Halsey LLP

(57) ABSTRACT

An encoding system includes a plurality of encoders each of which encodes a signal having continuity supplied from a corresponding one of a plurality of information sources and generates a packet containing a portion of the encoded signal. Each encoder is classified as a first encoder which encodes the signal, or a second encoder which transfers the packet from at least one of the first encoders, to a communication network and which, when the first encoder has failed, replaces the failed first encoder. When a failure occurs in either one of the first and second encoders for any of the signals, the other one of the encoders detects the occurrence of the failure, reallocates the encoders other than the failed encoder so as to act as the first encoder or second encoder for respective ones of the information sources, and notifies each encoder of the result of the reallocation.

9 Claims, 15 Drawing Sheets

| Enc ID | Gr. # | Source Priority | Enc Status | IP | Streaming IP | Source ID |
|---|---|---|---|---|---|---|
| 1 | 1 | 1 | 1 | 10.0.0.1/8 | 230.11.3.1 | 1 |
| 2 | 1 | 1 | 1 | 10.0.0.2/8 | 230.11.3.2 | 2 |
| 3 | 2 | 2 | 1 | 10.0.0.3/8 | 230.11.3.3 | 3 |
| 4 | 2 | 2 | 1 | 10.0.0.4/8 | 230.11.3.4 | 4 |
| 5 | 1 | 1<br>1 | 3 | 10.0.0.5/8 | 230.11.3.1<br>230.11.3.2 | 1<br>2 |
| 6 | 2 | 2<br>2 | 3 | 10.0.0.6/8 | 230.11.3.3<br>230.11.3.4 | 3<br>4 |

| Enc ID | Gr. # | Source Priority | Enc Status | IP | Streaming IP | Source ID |
|---|---|---|---|---|---|---|
| 1 | 1 | 1 | 2 | 10.0.0.1/8 | 230.11.3.1 | 1 |
| 2 | 1 | 1 | 1 | 10.0.0.2/8 | 230.11.3.2 | 2 |
| 3 | 1 | 2 | 1 | 10.0.0.3/8 | 230.11.3.3 | 3 |
| 4 | 1 | 2 | 1 | 10.0.0.4/8 | 230.11.3.4 | 4 |
| 5 | 1 | 1 | 1 | 10.0.0.5/8 | 230.11.3.1 | 1 |
| 6 | 1 | 2<br>2<br>1<br>1 | 3 | 10.0.0.6/8 | 230.11.3.3<br>230.11.3.4<br>230.11.3.1<br>230.11.3.2 | 3<br>4<br>1<br>2 |

| Enc ID | Gr. # | Source Priority | Enc Status | IP | Streaming IP | Source ID |
|---|---|---|---|---|---|---|
| 1 | 1 | 1 | 1 | 10.0.0.1/8 | 230.11.3.1 | 1 |
| 2 | 1 | 1 | 1 | 10.0.0.2/8 | 230.11.3.2 | 2 |
| 3 | 2 | 2 | 2 | 10.0.0.3/8 | 230.11.3.3 | 3 |
| 4 | 2 | 2 | 1 | 10.0.0.4/8 | 230.11.3.4 | 4 |
| 5 | 1 | 1<br>1 | 1 | 10.0.0.5/8 | 230.11.3.1<br>230.11.3.2 | 1<br>2 |
| 6 | 2 | 2 | 1 | 10.0.0.6/8 | 230.11.3.3 | 3 |

1701

1700

ENCODING SYSTEM AND ENCODER REALLOCATION METHOD

CROSS-REFERENCE TO RELATED APPLICATION

This application is a continuation application and is based upon PCT/JP2012/057060, filed on Mar. 19, 2012, the entire contents of which are incorporated herein by reference.

FIELD

The embodiments discussed herein are related to an encoding system that encodes a plurality of signals having continuity by using a plurality of encoders and transmits the encoded signals onto a communication network, and a method that reallocates the encoders in the encoding system for the respective signals.

BACKGROUND

Services that broadcast or deliver signals having continuity, such as video signals of news or sports programs, via Internet Protocol (IP) networks (hereinafter simply referred to as IP networks) have been widely used in recent years. In such services, any dropout in a video signal being broadcast or delivered is not preferable, since end users may directly view the video being delivered via the IP network.

In view of this, there is proposed an encoding system that is equipped with a plurality of encoders for compressing a video signal as the video signal is output from a video information source such as a camera or a video editing apparatus, and that compresses the video signal by using one of the encoders (for example, refer to Japanese Laid-open Patent Publication No. 2011-217137).

For example, the encoding system disclosed in Japanese Laid-open Patent Publication No. 2011-217137 includes a working encoder and a standby encoder arranged in series. In this system, normally a video stream is encoded by the working encoder, and the encoded video stream is then temporarily buffered in the standby encoder and thereafter transmitted out onto a transmission line. In the event of failure of the working encoder, the video stream is input directly into the standby encoder which then encodes the video stream and transmits the encoded video stream onto the transmission line. In this case, the standby encoder compares the buffered video stream and the directly input video stream to identify the position at which the transmission of the video stream was interrupted due to the failure of the working encoder, and resumes the transmission of the video stream from the interrupted position. With this arrangement, even when a failure occurs in the working encoder, any dropout can be prevented from occurring in the video stream being transmitted out on the transmission line.

SUMMARY

However, with the encoding system described above, when a failure occurs in one encoder handling one video signal, if a failure also occurs in the other encoder, the system will end up being unable to deliver the video signal.

According to one embodiment, an encoding system which encodes signals having continuity supplied from a plurality of information sources and transmits the encoded signals onto a communication network is provided. The encoding system includes: a plurality of encoders each of which encodes the signal having continuity supplied from a corresponding one of the plurality of information sources and generates a packet containing a portion of the encoded signal; a matrix switch which directs the signals from the plurality of information sources to each of the plurality of encoders; and a network switch which transfers the packet output from any one of the plurality of encoders to another one of the plurality of encoders or to the communication network.

The plurality of encoders are each classified as a first encoder which encodes the signal supplied from one of the plurality of information sources, or a second encoder which receives via the network switch the packet output from at least one of the first encoders and transfers the packet to the communication network and which, in the event of failure of one of the first encoders, replaces the failed first encoder, generates the packet by encoding the signal to be encoded by the failed first encoder, and transmits the packet via the network switch onto the communication network. When a failure occurs in either one of the first and second encoders through which the signal from a designated one of the plurality of information sources is routed, and the occurrence of the failure is detected by the other of the first and second encoders, the other encoder reallocates the plurality of encoders other than the failed encoder so as to act as the first encoder or second encoder for the respective ones of the plurality of information sources, and notifies each of the plurality of encoders of the result of the reallocation. Then, each of the plurality of encoders is set in accordance with the result of the reallocation to act as the first encoder or the second encoder for the signal supplied from one of the plurality of information sources.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 16 is a diagram illustrating one example of the management table updated when a failure has occurred in a working encoder corresponding to a video information source having relatively high priority.

FIG. 17 is a diagram illustrating one example of the management table updated when a failure has occurred in a working encoder corresponding to a video information source having relatively low priority.

DESCRIPTION OF EMBODIMENTS

An encoding system according to one embodiment will be described below with reference to the drawings. The encoding system encodes a video signal, which is one example of a signal having continuity, specifically, time continuity, and transmits the encoded video signal onto a communication network. For this purpose, the encoding system includes working encoders the number of which is equal to the number of video information sources, each video information source being one example of an information source of a signal having continuity, and standby encoders the number of which is smaller than the number of working encoders but not smaller than two. In this encoding system, when all the encoders are functioning normally, the video signal output from each video information source is encoded by one of the working encoders and thereafter transmitted out via one of the standby encoders onto an IP network. If a failure occurs in any one of the encoders and the failed encoder is unable to send out a packet containing an encoded video signal, another one of the encoders that is handling the same video signal as the failed encoder detects the occurrence of the failure. Then, the encoder that detected the occurrence of the failure updates a management table that specifies which encoder is to function as a working encoder or standby encoder for each video signal. More specifically, the encoder that detected the occurrence of the failure updates the management table so that the standby encoder used for a second video information source having lower priority than a first video information source that supplies the video signal to be handled by the failed encoder will also be used as the standby encoder for the first video information source. Then, the encoder that detected the occurrence of the failure notifies the other encoders of the updated management table. In accordance with the updated management table, each encoder changes the video signal to be handled.

Figure 1:
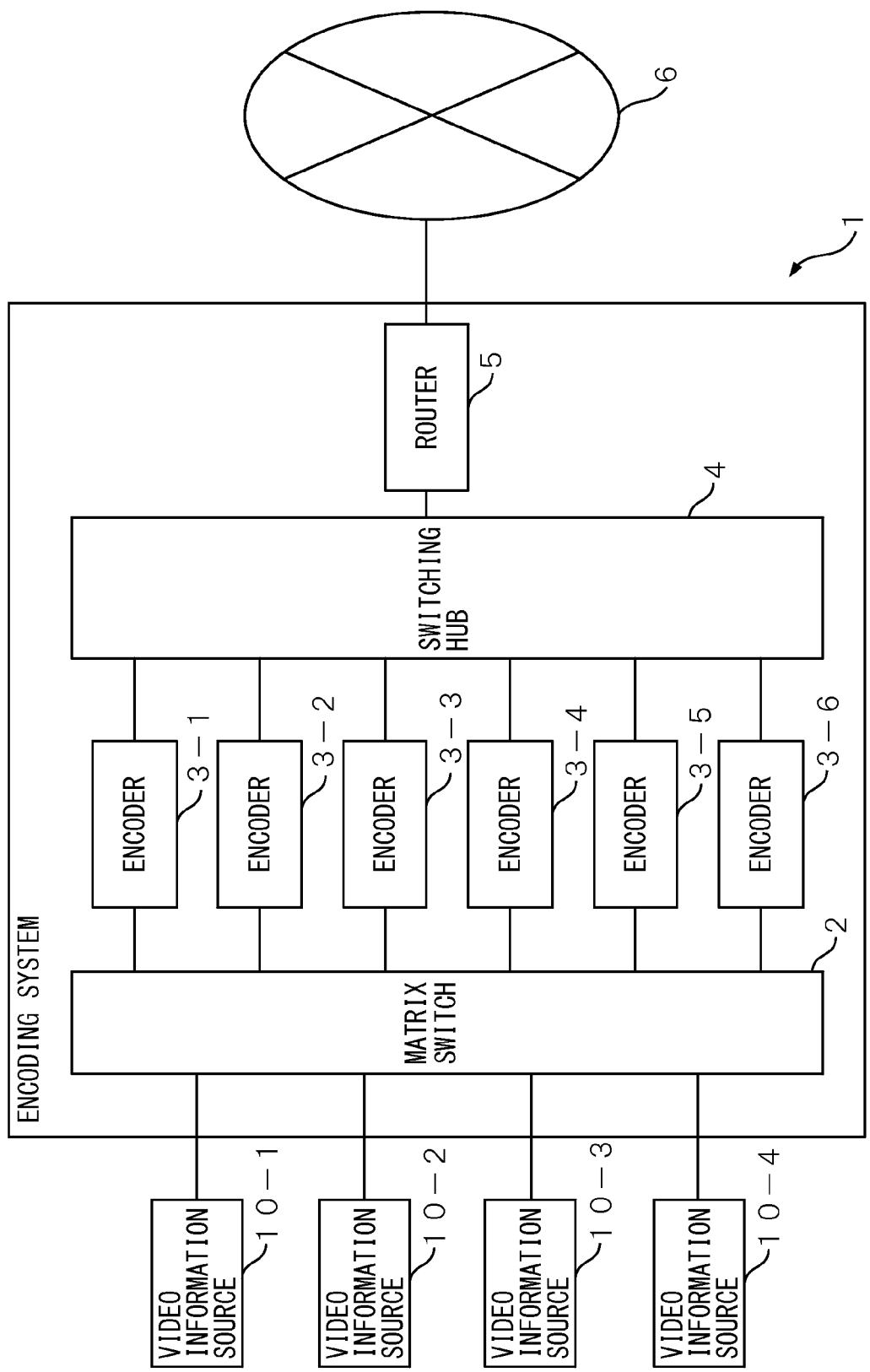
FIG. 1 is a diagram illustrating schematically the configuration of an encoding system according to one embodiment.

FIG. 1 is a diagram illustrating schematically the configuration of the encoding system according to the one embodiment. The encoding system 1 includes a matrix switch 2, six encoders 3-1 to 3-6, a switching hub 4, and a router 5. The encoding system 1 may further include a network management device (not depicted) for managing packet traffic that flows through the encoders 3-1 to 3-6, the switching hub 4, and the router 5. The number of encoders in the encoding system 1 is not limited to six. The encoding system 1 may include any number of encoders, as long as the number is larger than one plus the number of video information sources that provide video signals to the encoding system 1 but is smaller than twice the number of video information sources.

The matrix switch 2 has a plurality of input terminals to which the video signals are input and a plurality of output terminals from which the video signals are output.

The plurality of video information sources 10-1 to 10-4 that provide the video signals to the encoding system 1 are connected to the respective input terminals of the matrix switch 2. Each output terminal of the matrix switch 2 is connected via a video signal transmission line to one of a plurality of video input terminals provided on the respective encoders 3-1 to 3-6. The matrix switch 2 connects each of the plurality of input terminals to a selected one of the plurality of output terminals, for example, based on setup information supplied from an external device. The matrix switch 2 supplies the video signal acquired from each video information source to a designated one of the encoders 3-1 to 3-6.

The encoders 3-1 to 3-6 are classified into working encoders and standby encoders. Of the encoders 3-1 to 3-6, each encoder designated as a working encoder encodes the video signal supplied via the matrix switch 2 from one of the video information sources 10-1 to 10-4. Each working encoder converts the encoded video signal into IP packets, and transfers the IP packets via the switching hub 4 to a standby encoder. Of the encoders 3-1 to 3-6, each encoder designated as a standby encoder normally receives the IP packets from its associated working encoder, changes the destination address of each received IP packet, and transmits the IP packets onto the IP network 6. In the event that a failure occurs in the working encoder, the standby encoder in place of the failed encoder encodes the video signal.

Any one of the encoders 3-1 to 3-6 can be used as either a working encoder or a standby encoder. For example, the encoding system 1 may set the encoders 3-1 to 3-4 as working encoders and the encoders 3-5 and 3-6 as standby encoders.

The details of the encoders 3-1 to 3-6 and the encoder switching procedure in the event of failure of any one of the encoders will be described later.

The switching hub 4 is one example of a network switch, and transfers packets between the respective encoders and between each one of the encoders and the router 5. For this purpose, the switching hub 4 has a plurality of IP network connection ports each of which is connected to one of the encoders 3-1 to 3-6 as well as to the router 5 via an IP packet transmission signal line. The switching hub 4 relays communications between each one of the encoders 3-1 to 3-6 and the router 5. For this purpose, the switching hub 4 refers to the destination address stored in the header of each IP packet received from each one of the encoders 3-1 to 3-6, and outputs the IP packet at the port connected to the router 5 or the encoder corresponding to the destination address.

The router 5 is connected between the switching hub 4 and the IP network 6 which is one example of the communication network. The router 5 performs routing for the IP packets received via the switching hub 4 from any one of the encoders 3-1 to 3-6, and transmits out the IP packets onto the IP network 6.

Next, video signal flows will be described for the case where all the encoders are functioning normally and for the case where a failure occurs in one of the encoders. After that, failure detection and switching operations performed by each encoder will be described.

Figure 2:
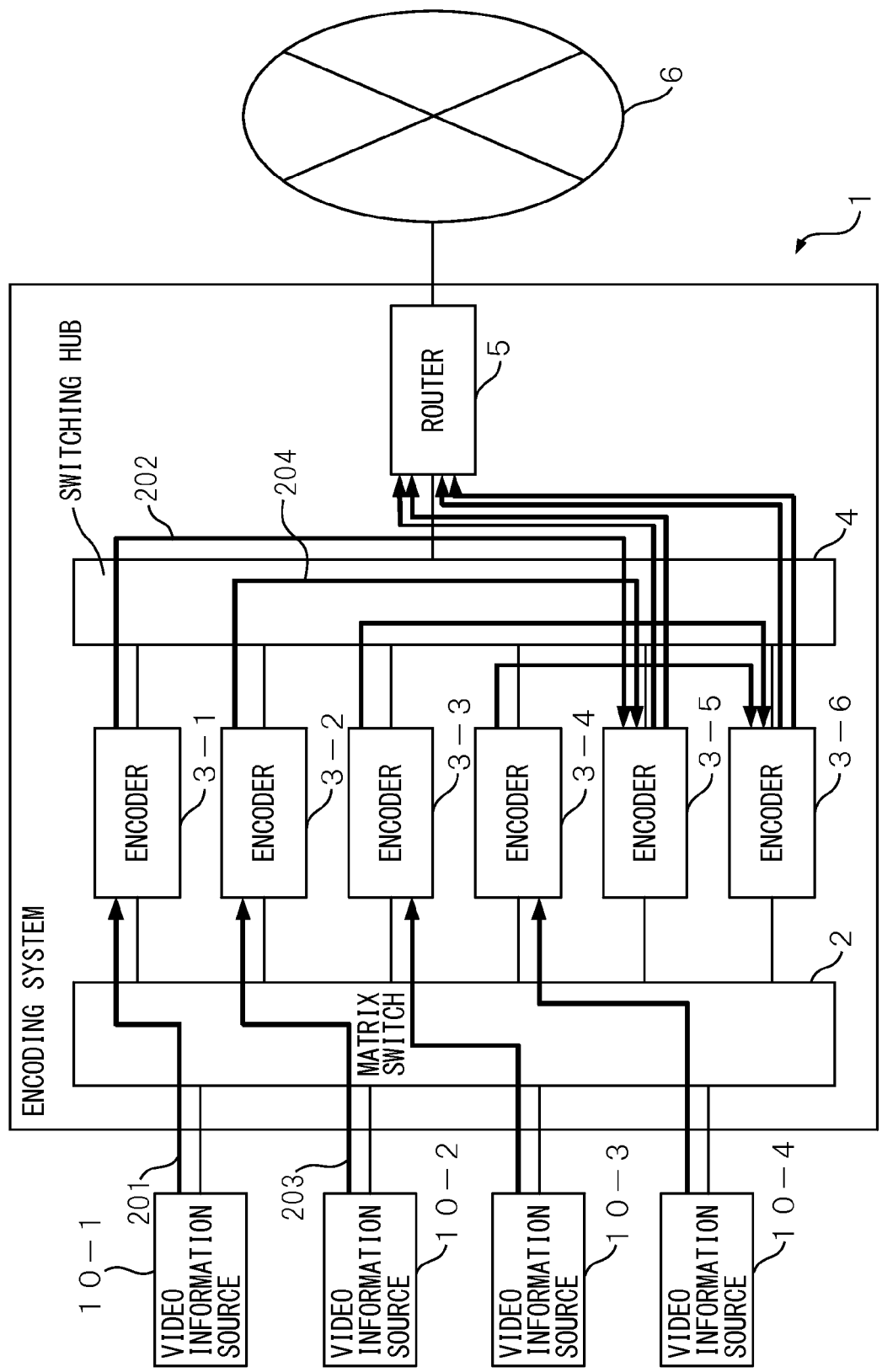
FIG. 2 is a diagram illustrating video signal flows and the grouping of encoders for respective video information sources in normal operation conditions.

FIG. 2 is a diagram illustrating the video signal flows and the grouping of the encoders for the respective video information sources for the case where all the encoders are functioning normally. In the present embodiment, the encoders 3-1 to 3-4 are designated as working encoder, and the encoders 3-5 and 3-6 as standby encoders. The encoders 3-1, 3-2, and 3-5 form one group and encode the video signals supplied from the video information sources 10-1 and 10-2. More specifically, as indicated by an arrow 201, the video signal supplied from the video information source 10-1 is input to the encoder 3-1 via the matrix switch 2, and is encoded by the encoder 3-1. Further, the encoder 3-1 sequentially converts the encoded video signal into IP packets. The encoder 3-1 then transfers the IP packets via the switching hub 4 to the encoder 3-5, as indicated by an arrow 202.

Likewise, as indicated by an arrow 203, the video signal supplied from the video information source 10-2 is input to the encoder 3-2 via the matrix switch 2, and is encoded by the encoder 3-2. Then, the encoder 3-2 sequentially converts the encoded video signal into IP packets. The encoder 3-2 then transfers the IP packets via the switching hub 4 to the encoder 3-5, as indicated by an arrow 204.

The encoder 3-5 that received the IP packets of the encoded video signals from the encoders 3-1 and 3-2 changes the destination address of each IP packet, and transmits them onto the IP network 6.

The encoders 3-3, 3-4, and 3-6 form another group. The video signal supplied from the video information source 10-3 is encoded by the encoder 3-3 where the encoded video signal is sequentially converted into IP packets. Then, the encoder 3-3 transfers the IP packets via the switching hub 4 to the encoder 3-6. On the other hand, the video signal supplied from the video information source 10-4 is encoded by the encoder 3-4 where the encoded video signal is sequentially converted into IP packets. The encoder 3-4 then transfers the IP packets via the switching hub 4 to the encoder 3-6. The encoder 3-6 that received the IP packets of the encoded video signals from the encoders 3-3 and 3-4 changes the destination address of each IP packet, and transmits them onto the IP network 6.

Figure 3:
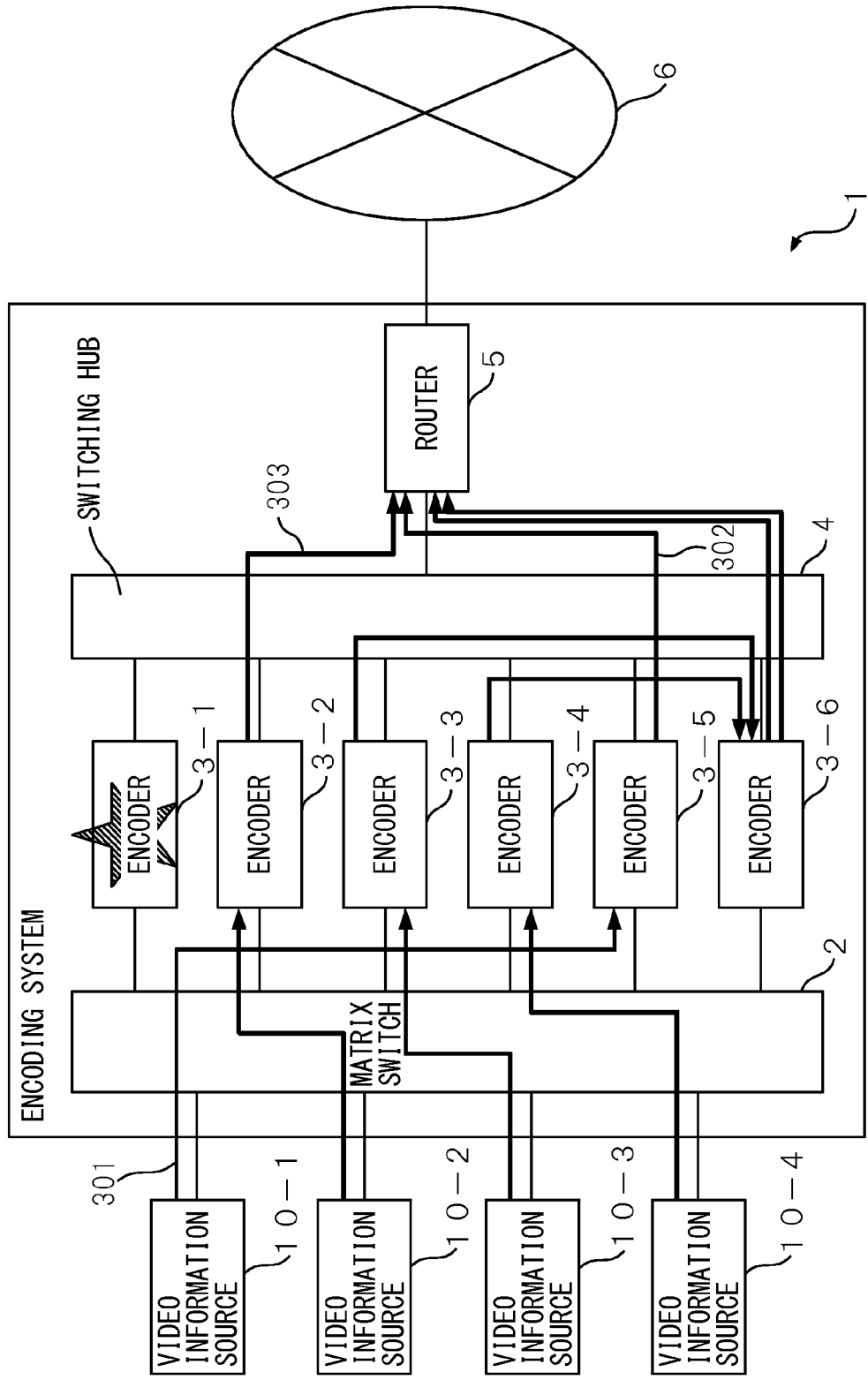
FIG. 3 is a diagram illustrating the video signal flows immediately after a failure has occurred in one of working encoders.

FIG. 3 is a diagram illustrating the video signal flows immediately after a failure has occurred in one of the working encoders. In the illustrated example, it is assumed that a failure has occurred in the encoder 3-1. In this case, the encoder 3-5 which becomes unable to receive IP packets from the encoder 3-1 detects that a failure has occurred in the encoder 3-1. Then, as indicated by an arrow 301, the encoder 3-5 in place of the encoder 3-1 receives the video signal from the video information source 10-1, encodes the video signal, and converts the encoded video signal into IP packets. The encoder 3-5 then transmits out the IP packets of the encoded video signal via the switching hub 4 onto the IP network 6, as indicated by an arrow 302. As a result, the encoder 3-5 no longer functions as the standby encoder for the encoder 3-2. Therefore, the encoder 3-2, which encoded the video signal received from the video information source 10-2 and converted the encoded video signal into IP packets, also transmits out the IP packets via the switching hub 4 onto the IP network 6, as indicated by an arrow 303.

In the group different from the group to which the encoder 3-1 belongs, i.e., in the group to which the encoders 3-3, 3-4, and 3-6 belong, the video signal flow is unaffected by the failure of the encoder 3-1.

Figure 4:
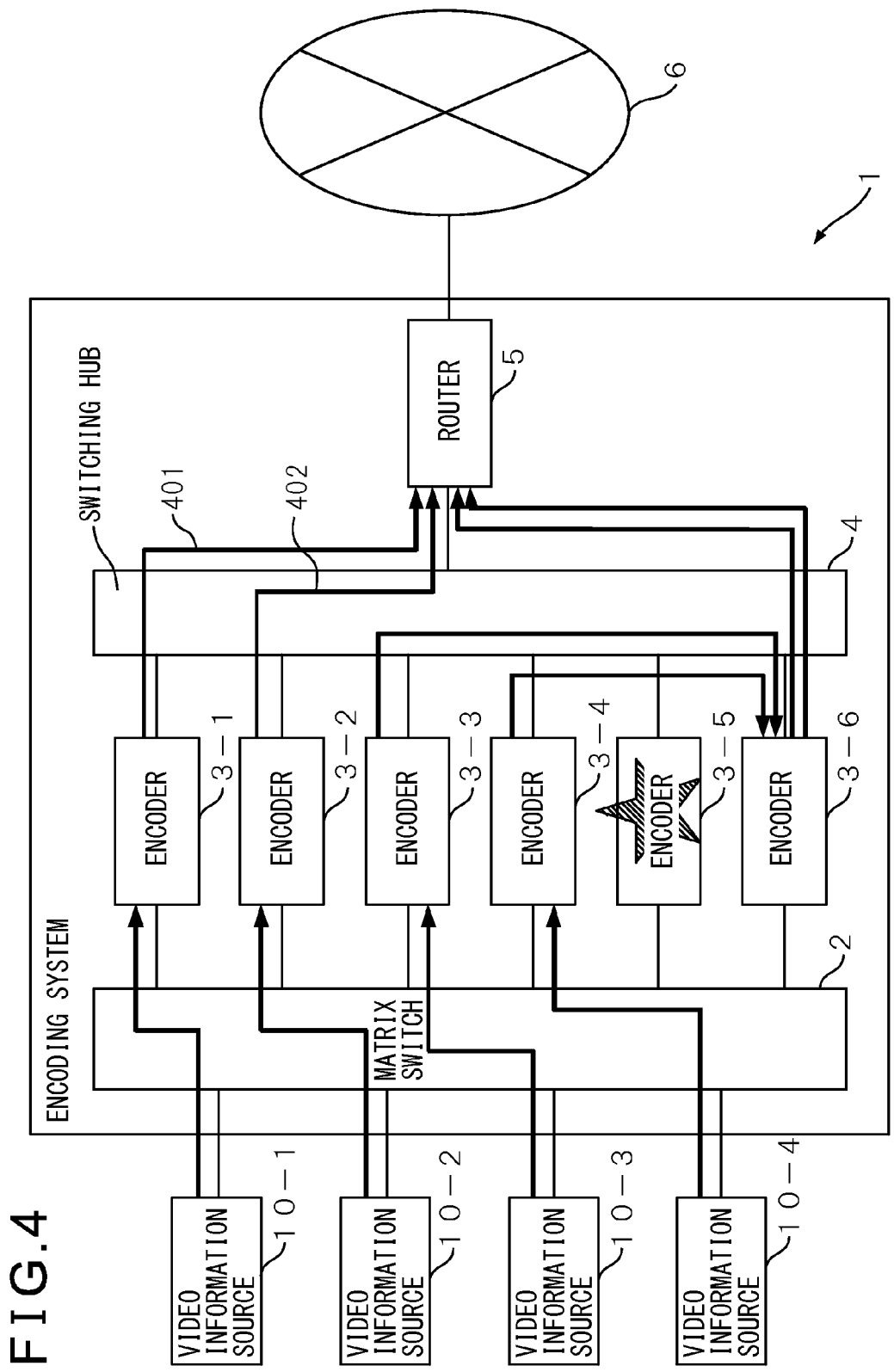
FIG. 4 is a diagram illustrating the video signal flows immediately after a failure has occurred in a standby encoder.

FIG. 4 is a diagram illustrating the video signal flows immediately after a failure has occurred in the standby encoder. In the illustrated example, it is assumed that a failure has occurred in the encoder 3-5. In this case, the encoder 3-1 or 3-2 which becomes unable to receive a transmission confirmed IP packet that the encoder 3-5 returns each time an IP packet is sent out to the IP network 6 detects that a failure has occurred in the encoder 3-5. Then, as indicated by arrows 401 and 402, the encoders 3-1 and 3-2 transmit out the IP packets of the encoded video signals onto the IP network 6 without passing them through the standby encoder.

In the group different from the group to which the encoder 3-5 belongs, the video signal flow is unaffected by the failure of the encoder 3-5.

In the situation of FIG. 3 or 4, the video signals encoded by the unfailed encoders belonging to the same group as the failed encoder are transmitted onto the IP network 6 without passing through the standby encoder. As a result, if a failure also occurs in another encoder in the group, the video signals being encoded by this group will become unable to be transmitted out on the IP network 6.

To address this, the encoding system 1 according to the present embodiment reallocates the unfailed encoders between working and standby in accordance with a prescribed rule so that the video signal from any one of the video information sources will be transmitted out on the IP network 6 after passing through two encoders.

Figure 5:
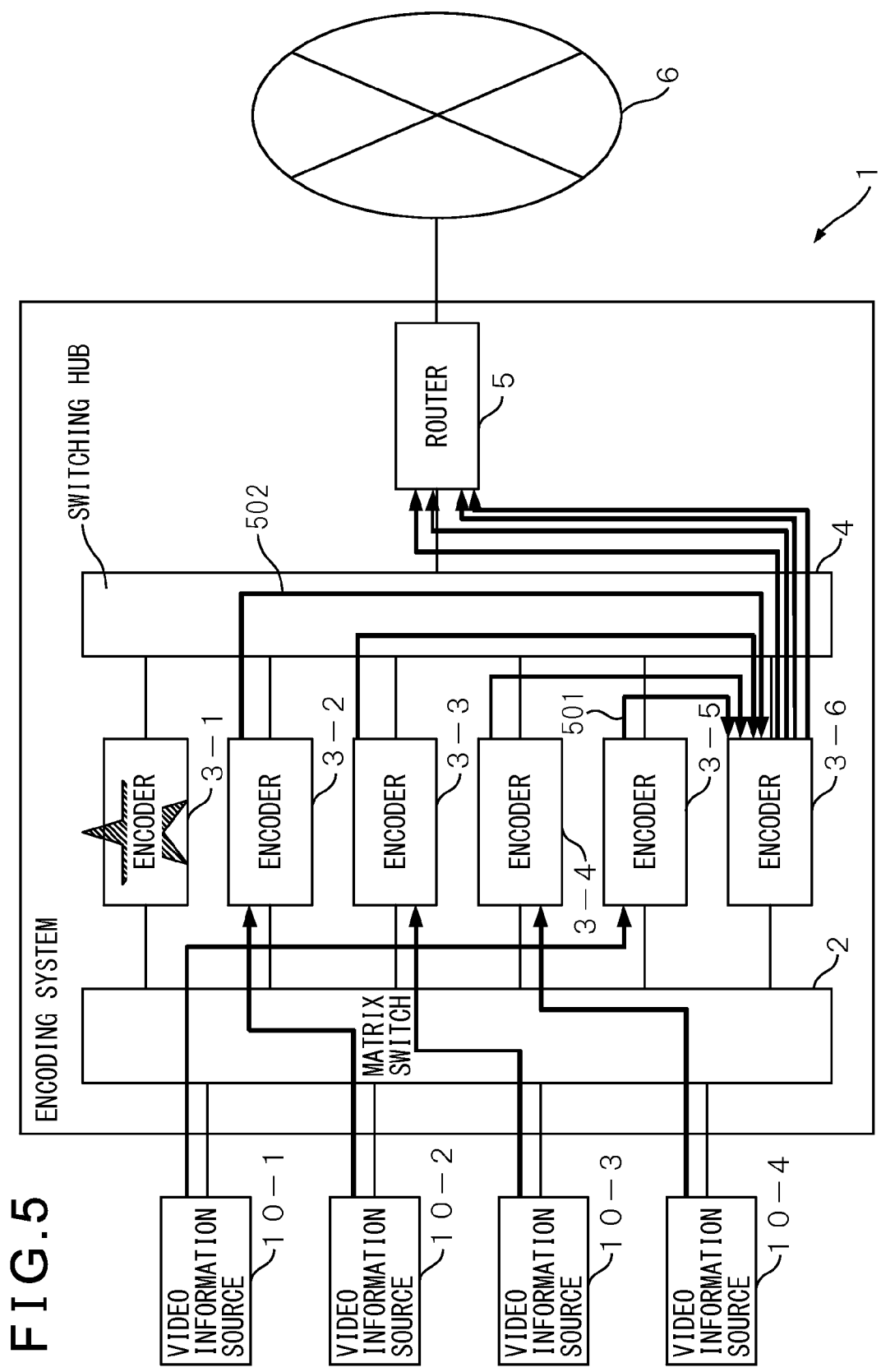
FIG. 5 is a diagram illustrating the video signal flows after the encoders have been reallocated in response to the situation of FIG. 3.

FIG. 5 is a diagram illustrating the video signal flows after the encoders have been reallocated in response to the situation of FIG. 3.

In the situation in FIG. 3 in which the encoder 3-1 has failed, the encoder 3-6 is still operating as a standby encoder. Therefore, as indicated by arrows 501 and 502 in FIG. 5, the IP packets containing the video signals supplied from the video information sources 10-1 and 10-2 and encoded by the encoders 3-5 and 3-2 are first transferred to the encoder 3-6. Then, the encoder 3-6 changes the destination addresses of the IP packets to those corresponding to the respective video information sources 10-1 and 10-2, and thereafter transmits out the IP packets onto the IP network 6. In other words, in this case, the encoder 3-6 functions as the standby encoder for all the video information sources. Therefore, if a failure also occurs in any one of the unfailed encoders in the situation of FIG. 5, all the video signals can be transmitted out on the IP network 6 without any dropouts.

In the event of failure of the encoder 3-5, the encoding system 1 can likewise change the video signal path so that the IP packets containing the video signals encoded by the encoders 3-1 and 3-2 will be transmitted out on the IP network 6 after passing through the encoder 3-6.

The details of the encoders 3-1 to 3-6 will be described below. The encoders 3-1 to 3-6 can be configured to have the same configuration and function. The following description therefore deals only with the encoder 3-1.

Figure 6:
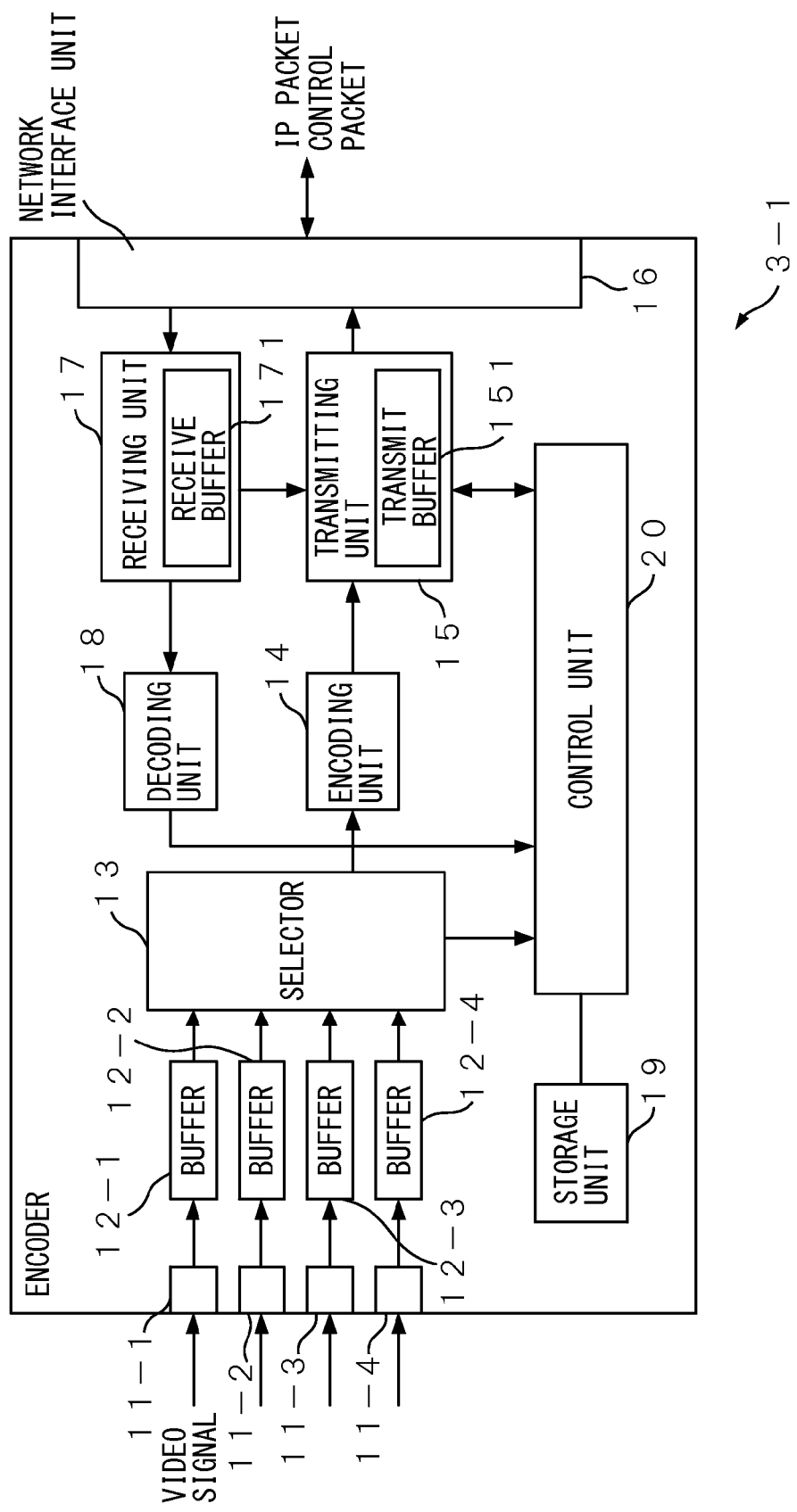
FIG. 6 is a diagram illustrating schematically the configuration of the encoder.

FIG. 6 is a diagram illustrating schematically the configuration of the encoder 3-1. The encoder 3-1 includes video input terminals 11-1 to 11-4, buffers 12-1 to 12-4, a selector 13, an encoding unit 14, a transmitting unit 15, a network interface unit 16, a receiving unit 17, a decoding unit 18, a storage unit 19, and a control unit 20. The buffers 12-1 to 12-4, the selector 13, the encoding unit 14, the transmitting unit 15, the receiving unit 17, the decoding unit 18, the storage unit 19, and the control unit 20 may be implemented as separate circuits, or may be implemented on a single integrated circuit.

Each of the video input terminals 11-1 to 11-4 is connected via a video transmission signal line to one of the output terminals of the matrix switch 2, and receives the video signal from one of the video information sources 10-1 to 10-4. In the present embodiment, the video input terminals 11-1 to 11-4 correspond one for one with the video information sources 10-1 to 10-4 that supply the video signals for input to the respective video input terminals. For example, the video signal supplied from the video information source 10-1 is input to the video input terminal 11-1. Likewise, the video signals supplied from the video information sources 10-2 to 10-4 are respectively input to the video input terminal 11-2 to 11-4. The control unit 20 can identify the video information source of each video signal by identifying the video input terminal to which the video signal has been input.

The number of video input terminals of the encoder 3-1 is not limited to four. It is preferable that the encoder 3-1 includes video input terminals the number of which is not smaller than the number of video information sources that supply the video signals that may be encoded by the encoder 3-1.

The video signals input to the respective video input terminals 11-1 to 11-4 are transferred to the respective buffers 12-1 to 12-4.

The buffers 12-1 to 12-4 are each formed, for example, from a readable/writable volatile semiconductor memory, and store the video signals received via the video input terminals 11-1 to 11-4, respectively, for a predetermined period of time. In the standby encoder, the video signal stored in each of the buffers 12-1 to 12-4 is used to identify the position within the video signal at which the encoding of the video signal was interrupted in a failed encoder. Accordingly, the predetermined period of time is set longer than the period of time during which the encoder 3-1 waits for the reception of an IP packet in order to determine that the encoder 3-1 is no longer receiving any IP packets; for example, it is set equal to 160 msec to 200 msec so that the video signal can be stored for a period of time long enough to be able to identify the interrupted position.

In the working encoder, the video signal stored in one of the buffers 12-1 to 12-4 is sequentially read out by the selector 13 as the predetermined period of time elapses, and the readout video signal is passed to the encoding unit 14. On the other hand, in the standby encoder, the video signal stored in each of the buffers 12-1 to 12-4 is read out via the selector 13 into the control unit 20 in order to identify the position at which the encoding of the video signal was interrupted. Once the interrupted position has been identified, the video signal after the interrupted position identified by the control unit 20 is sequentially read out of the corresponding one of the buffers 12-1 to 12-4 that stores the video signal the encoding of which was interrupted, and the thus readout video signal is passed via the selector 13 to the encoding unit 14.

The selector 13 includes, for example, an N-input, two-output switch, and passes the video signal received from one of the buffers 12-1 to 12-4 to the encoding unit 14 or the control unit 20 under the control of a control signal from the control unit 20.

In order to reduce the amount of data needed to represent the video signal received from one of the buffers 12-1 to 12-4, the encoding unit 14 encodes the video signal. For example, the encoding unit 14 encodes the video signal in accordance with a video coding standard, such as MPEG-2, MPEG-4, or MPEG-4 Part 10 Advanced Video Coding (MPEG-4 AVC/H.264), defined by the Moving Picture Experts Group (MPEG). Then, the encoding unit 14 packetizes the encoded video signal in accordance, for example, with the MPEG-2 transport stream (MPEG-2 TS) format. The encoding unit 14 passes the packetized encoded video signal to the transmitting unit 15.

The transmitting unit 15 first applies error-correction coding or error-detection coding to the packetized encoded video signal received from the encoding unit 14 or the receiving unit 17, and then converts the encoded video signal into IP packets.

Figure 7:
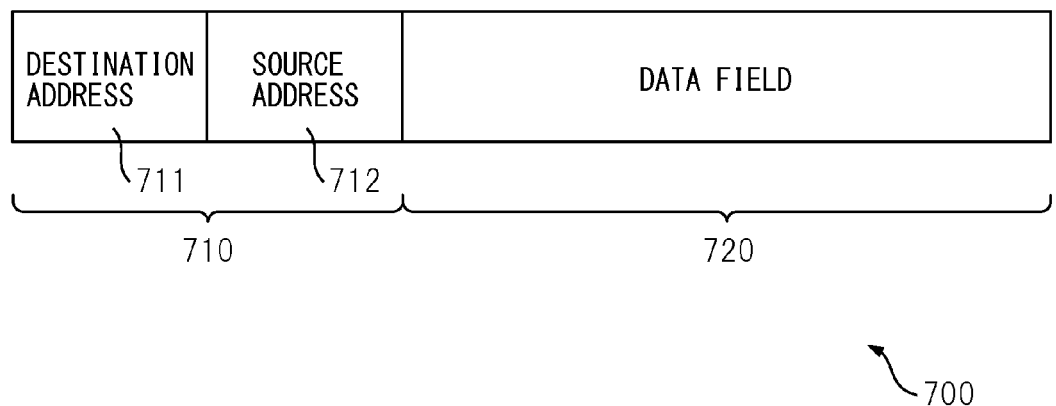
FIG. 7 is a diagram illustrating the format of an IP packet containing an encoded video signal.

FIG. 7 is a diagram illustrating the format of an IP packet containing the encoded video signal and generated by the transmitting unit 15 of the encoder according to the present embodiment. The IP packet 700 includes a header field 710 and a data field 720 in this order from the head.

The structure of the header field 710 is defined in accordance with the Internet Protocol. The header field 710 carries a destination address 711 and a source address 712. When the encoder 3-1 is a working encoder, the destination address 711 is the address of the standby encoder belonging to the same group as the encoder 3-1. On the other hand, when the encoder 3-1 is a standby encoder, the destination address 711 is the address to which the encoded video signal stored in the IP packet received from the receiving unit 17 is destined. In this case, the destination address may be, for example, a multicast address or the IP address of a specific server used to deliver the video signal. The source address 712 is the IP address of the encoder 3-1 itself.

The data field 720 stores the encoded video signal broken up, for example, in units of MPEG-2 TS packets. In the working encoder, the transmitting unit 15 periodically generates IP packets even when the video information source is not outputting a video signal. In this case, prescribed blank data is stored in the data field 720.

The transmitting unit 15 writes the destination address and source address received from the control unit 20 into the header of each IP packet. Then, the transmitting unit 15 includes one or a plurality of MPEG-2 TS packets into the data field of the IP packet to complete the packet. The transmitting unit 15 may further add a header conforming to the Transmission Control Protocol (TCP) or User Datagram Protocol (UDP) to the IP packet.

The transmitting unit 15 temporarily stores each generated IP packet in a transmit buffer 151. Then, the transmitting unit 15 transfers the IP packets stored in the transmit buffer 151 to the network interface unit 16 at predetermined intervals of time (for example, every 32 msec).

In the standby encoder, the IP packets stored in the transmit buffer 151 are deleted as they are output to the network interface unit 16. Further, the transmitting unit 15 extracts, from each IP packet output to the network interface unit 16, position information indicating the position of the video information contained in that IP packet, and generates a transmission confirmed packet containing that position information. Then, the transmitting unit 15 transmits the transmission confirmed packet to the working encoder.

The transmission confirmed packet is one example of a control packet used to control each encoder.

Figure 8:
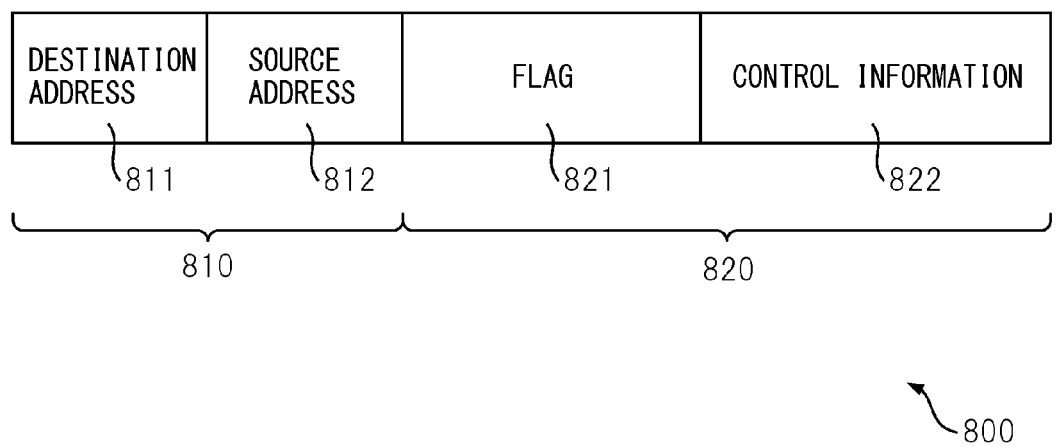
FIG. 8 is a diagram illustrating the format of a transmission confirmed packet.

FIG. 8 is a diagram illustrating the format of the control packet. The control packet 800 includes a header field 810 and a control field 820 in this order from the head. The structure of the header field 810 is defined in accordance with the Internet Protocol. The header field 810 carries a destination address 811 and a source address 812. In the case of the transmission confirmed packet, the destination address is the IP address of the working encoder, and the source address 812 is the IP address of the standby encoder itself.

The control field 820 carries a flag 821 which indicates the type of the control packet, and control information 822 which is used to control the encoder. When the control packet is a transmission confirmed packet, the flag 821 has a prescribed bit string corresponding to the transmission confirmed packet, and the control information 822 includes position information. The position information may be created as information indicating the continuity counter value carried in the header field of the MPEG-2 TS packet contained in the data field of the transmitted IP packet. Alternatively, the position information may be created as information indicating the sequence number contained in the TCP header field of the transmitted IP packet.

On the other hand, in the working encoder, each IP packet stored in the transmit buffer 151 is deleted upon confirming, from the position information carried in the transmission confirmed packet received from the standby encoder, that the IP packet has been transmitted out on the IP network 6.

Further, when control information such as failure detection information, restoration information, or management table is received from the control unit 20, the transmitting unit 15 generates a control packet containing the control information and passes the control packet to the network interface unit 16.

The network interface unit 16 includes an interface circuit for connecting the encoder 3-1 to the IP network 6. The network interface unit 16 passes each IP packet received from the transmitting unit 15 to the switching hub 4. Further, the network interface unit 16 passes each IP packet received from the switching hub 4 to the receiving unit 17.

The receiving unit 17 includes a receive buffer 171. In the case of the standby encoder, each IP packet received from the working encoder is temporarily stored in the receive buffer 171 for a predetermined period of time. The predetermined period of time may be set, for example, equal to the period of time that the encoded video stored in the receive buffer 171 can be decoded using the encoded video alone, i.e., the period of time needed for all the frames contained in at least one group of pictures (GOP) to be stored in the receive buffer 171. Each IP packet stored in the receive buffer 171 is output to the transmitting unit 15 after the predetermined period of time has elapsed. The receiving unit 17 may apply error-correction coding or error-detection coding to the data field of the IP packet before outputting the IP packet to the transmitting unit 15. Further, in the case of the standby encoder, the receiving unit 17 passes the source address contained in the IP packet to the control unit 20. When the control unit 20 detects a failure of the working encoder within the same group, the encoded video signal carried in the IP packet stored in the receive buffer 17 is output to the decoding unit 18.

Further, when a control packet is received from another encoder, the receiving unit 17 passes the control information carried in the control packet to the control unit 20. In the case of the working encoder, when a transmission confirmed packet is received from the standby encoder, the receiving unit 17 extracts the position information carried in the control field of the transmission confirmed packet and passes it to the transmitting unit 15.

When a failure occurs in the working encoder, the decoding unit 18 decodes the encoded video signal in order to identify the position at which the encoding being performed by the failed encoder was interrupted, and passes the decoded video signal to the control unit 20.

The storage unit 19 includes, for example, a readable/writable nonvolatile semiconductor memory. The storage unit 19 stores various kinds of information used to control the encoder 3-1, for example, priority for each video information source, destination address, and the management table that specifies the working and standby encoders.

Figure 9:
FIG. 9 illustrates one example of a management table corresponding to the situation of FIG. 2 where all the encoders are functioning normally.

FIG. 9 illustrates one example of the management table corresponding to the situation of FIG. 2 where all the encoders are functioning normally. Each row of the management table 900 stores information concerning one encoder. For example, the top row contains information concerning the encoder 3-1, while the bottom row contains information concerning the encoder 3-6. The columns of the management table 900 contain encoder identification number, encoder group number, video information source priority, encoder status, encoder IP address, video information source streaming IP address, and video information source identification number in this order from left to right.

The encoder identification number is a number used to discriminate each encoder in the encoding system 1 from the other encoders, and is uniquely set for each encoder. The physical address of the encoder may be used as the encoder identification number. The group to which the encoder belongs is set for each video information source that the standby encoder for that encoder handles, and the group number is set for each group. For example, in the example illustrated in FIG. 2, the encoder 3-5 handles the video signals supplied from the video information sources 10-1 and 10-2, so that the encoders 3-1, 3-2, and 3-5 that handle the video signals supplied from these video information sources are included in the same group "1". On the other hand, the encoder 3-6 handles the video signals supplied from the video information sources 10-3 and 10-4, so that the encoders 3-3, 3-4, and 3-6 that handle the video signals supplied from these video information sources are included in the same group "2".

The video information source priority is set such that the lower the numerical value assigned to it, the higher the priority. The encoder status indicates whether the encoder is a working encoder or a standby encoder and whether the encoder is functioning normally or is in a failure state. For example, status "1" indicates the corresponding encoder is a working encoder and is functioning normally. On the other hand, status "2" indicates the corresponding encoder is a working encoder and is in a failure state. Further, status "3" indicates the corresponding encoder is a standby encoder and is functioning normally. On the other hand, status "4" indicates the corresponding encoder is a standby encoder and is in a failure state.

The video information source identification number is a number used to discriminate each video information source from the other video information sources, and is uniquely set for each video information source.

The control unit 20 controls each unit of the encoder 3-1. Further, by referring to the management table, the control unit 20 identifies the destination address of the encoded video signal converted by the transmitting unit 15 into IP packets, and passes the destination address to the transmitting unit 15 along with the address of the encoder 3-1 itself. Furthermore, the control unit 20 monitors whether the encoded video signal has been transmitted normally, and thereby detects the occurrence of a failure in any one of the encoders belonging to the same group as the encoder 3-1.

Upon detecting the occurrence of a failure, the control unit 20 performs encoder switching to reroute the video signal path.

The control unit 20 reallocates all the encoders contained in the encoding system 1 between working and standby, and updates the management table to reflect the reallocation results. Then, the control unit 20 passes the updated management table and the addresses of all the encoders to the transmitting unit 15 which then generates a control packet containing the updated management table. The control packet is sent out to all the encoders via the switching hub 4.

Figure 10:
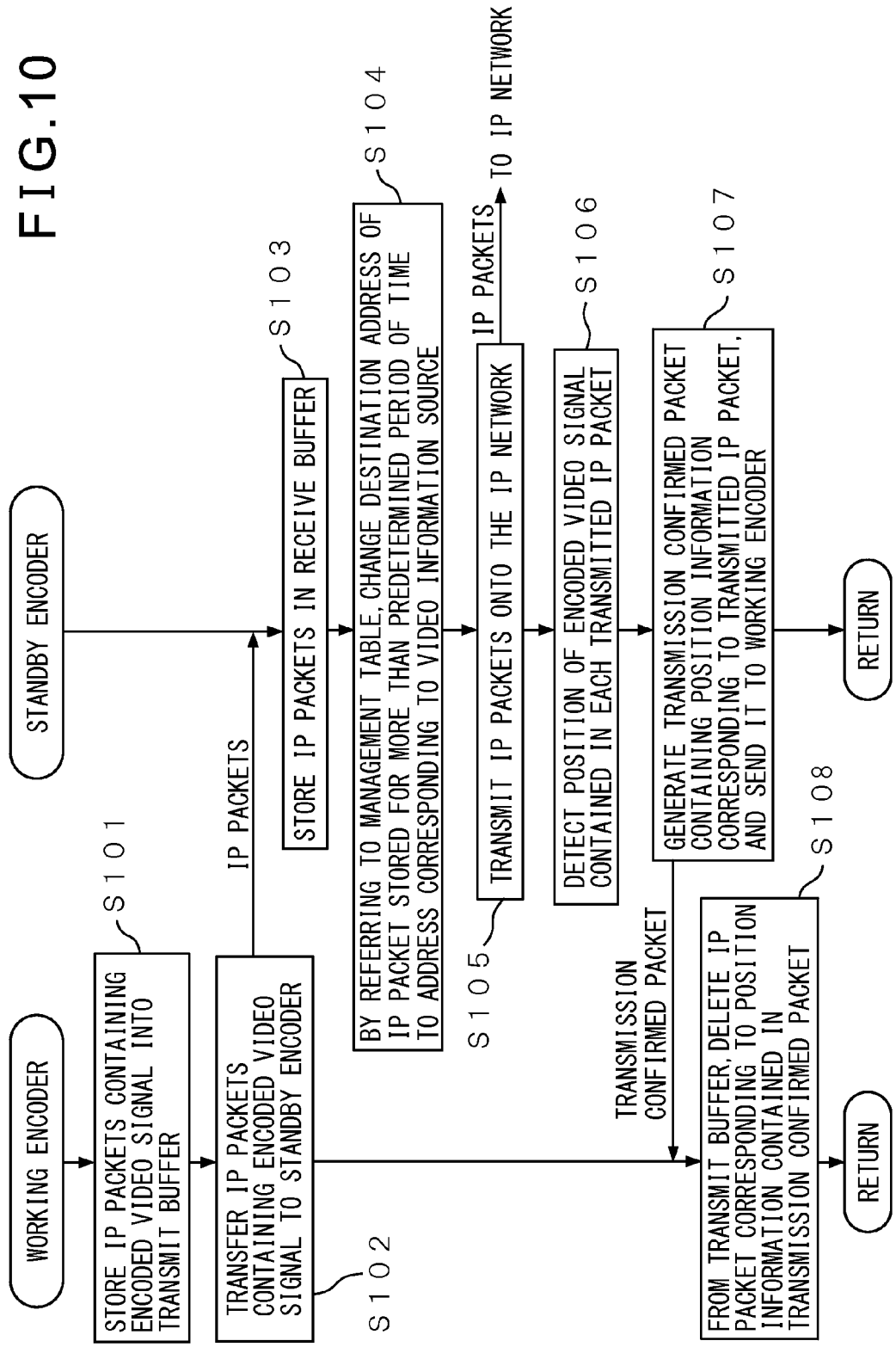
FIG. 10 is a sequence diagram illustrating a procedure for exchanging signals between working and standby encoders when all the encoders are functioning normally.

FIG. 10 is a sequence diagram illustrating a procedure for exchanging signals between the working and standby encoders when all the encoders are functioning normally. In the example of FIG. 10, it is assumed that the encoders 3-1 and 3-5 handle the video signal from the same video information source, the encoder 3-1 is the working encoder and the encoder 3-5 is the standby encoder.

The encoder 3-1 stores the IP packets containing the encoded video signal and generated by the transmitting unit 15 into the transmit buffer 151 (step S101). Then, the encoder 3-1 transfers the IP packets containing the encoded video signal and stored in the transmit buffer 151 to the standby encoder 3-5 at predetermined intervals of time (step S102).

When each packet from the encoder 3-1 is received via the switching hub 4, the encoder 3-5 stores the received IP packet into the receive buffer 171 (step S103). When a predetermined period of time has elapsed after storing in the receive buffer 171, the receiving unit 17 outputs the IP packet to the transmitting unit 15. The transmitting unit 15 refers to the management table and changes the destination address of the received IP packet to the address corresponding to the video information source (step S104). Then, the transmitting unit 15 stores the IP packet in the transmit buffer 151. The transmitting unit 15 sequentially transmits the IP packets stored in the transmit buffer 151 onto the IP network 6, staring with the oldest one (step S105). Then, the transmitting unit 15 detects the position of the encoded video signal contained in each IP packet transmitted on the IP network 6, by referring to the header of the IP packet or the header of the MPEG-2 TS packet carried in the data field of the IP packet (step S106). The transmitting unit 15 then generates a transmission confirmed packet containing the position information indicating the position of the encoded video signal contained in the transmitted IP packet, and sends the transmission confirmed packet to the working encoder 3-1 (step S107).

When the transmission confirmed packet is received from the encoder 3-5, the receiving unit 17 in the encoder 3-1 extracts the position information contained in the transmission confirmed packet, and passes it to the transmitting unit 15. Thereupon, the transmitting unit 15 deletes from the transmit buffer 151 the IP packet that carries the encoded video signal corresponding to the position information contained in the transmission confirmed packet (step S108).

Figure 11:
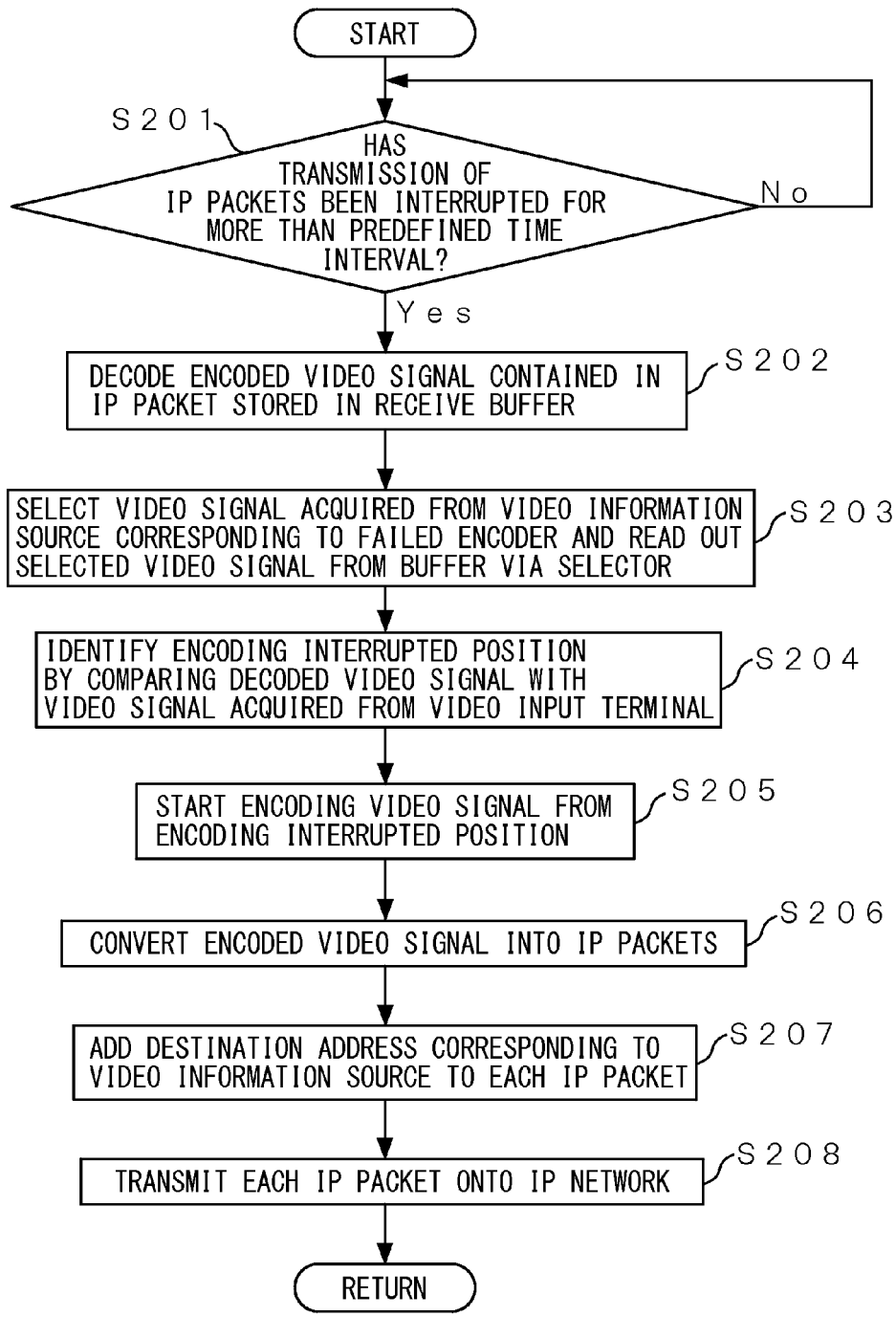
FIG. 11 is an operation flowchart illustrating a failure detection and video signal path switching process performed by a control unit in the standby encoder when a failure occurs in the working encoder that is transferring the encoded video signal to the standby encoder.

FIG. 11 is an operation flowchart illustrating the failure detection and video signal path switching process performed by the control unit 20 in the standby encoder when a failure occurs in the working encoder that is transferring the encoded video signal to the standby encoder.

The control unit 20 determines whether or not the transmission of IP packets from the working encoder has been interrupted for more than a predefined time interval (step S201). The predefined time interval is set, for example, longer than the transmission interval of IP packets from the working encoder but shorter than the predetermined period of time during which each IP packet is held in the receive buffer 171; for example, it is set to 50 msec to 100 msec. There may be cases where the standby encoder is accepting IP packets from a plurality of working encoders, as in the case of the encoder 3-5 depicted in FIG. 2. In such cases, by referring to the source address of the IP packet, the control unit 20 can identify the working encoder that transmitted the IP packet. If the encoder has received a new IP packet from a given working encoder within the predefined time interval after receiving the previous IP packet (No in step S201), the control unit 20 determines that the working encoder is functioning normally. Then, the control unit 20 repeats the process of step S201.

On the other hand, if the encoder does not receive a new IP packet from that given working encoder within the predefined time interval after receiving the previous IP packet (Yes in step S201), the control unit 20 determines that a failure has occurred in that given working encoder. The control unit 20 then causes the encoded video signal contained in each IP packet stored in the receive buffer 171 to be output to the decoding unit 18. The decoding unit 18 decodes the received encoded video signal (step S202). The decoding unit 18 passes the decoded video signal to the control unit 20.

In the meantime, the control unit 20 reads out via the selector 13 the video signal stored in one of the buffers 12-1 to 12-4 that corresponds to the video information source corresponding to the failed encoder (step S203). As previously described, the video input terminals 11-1 to 11-4 and the buffers 12-1 to 12-4 correspond one for one with the video information sources 10-1 to 10-4. Accordingly, by referring to the management table and identifying the video information source that supplied the video signal that the working encoder was encoding at the time of the occurrence of the failure, the control unit 20 can identify the buffer in which the video signal from the video information source is stored.

The control unit 20 identifies the encoding interrupted position by comparing the decoded video signal with the video signal acquired from the video input terminal (step S204). For example, the control unit 20 performs pattern matching between the last frame contained in the decoded video signal and each frame contained in the video signal acquired from the video input terminal, and computes a cross-correlation value between them. Then, the control unit 20 determines that the frame that maximizes the cross-correlation value among the frames contained in the signal acquired from the buffer is the encoding interrupted position.

The control unit 20 causes the video signal after the identified encoding interrupted position to be output from the buffer via the selector 13 to the encoding unit 14. The encoding unit 14 then starts encoding the video signal from the encoding interrupted position (step S205). The encoding unit 14 passes the encoded video signal to the transmitting unit 15. The transmitting unit 15 converts the encoded video signal into IP packets (step S206). The transmitting unit 15 then adds the destination address corresponding to the video information source to each IP packet (step S207). Then, the transmitting unit 15 sequentially transmits the IP packets onto the IP network 6 (step S208). Thus, in the encoding system 1, if the working encoder fails, the standby encoder is switched in to replace the failed encoder to encode the video signal so that the encoded video signal can be transmitted out on the IP network 6 without any dropouts.

Figure 12:
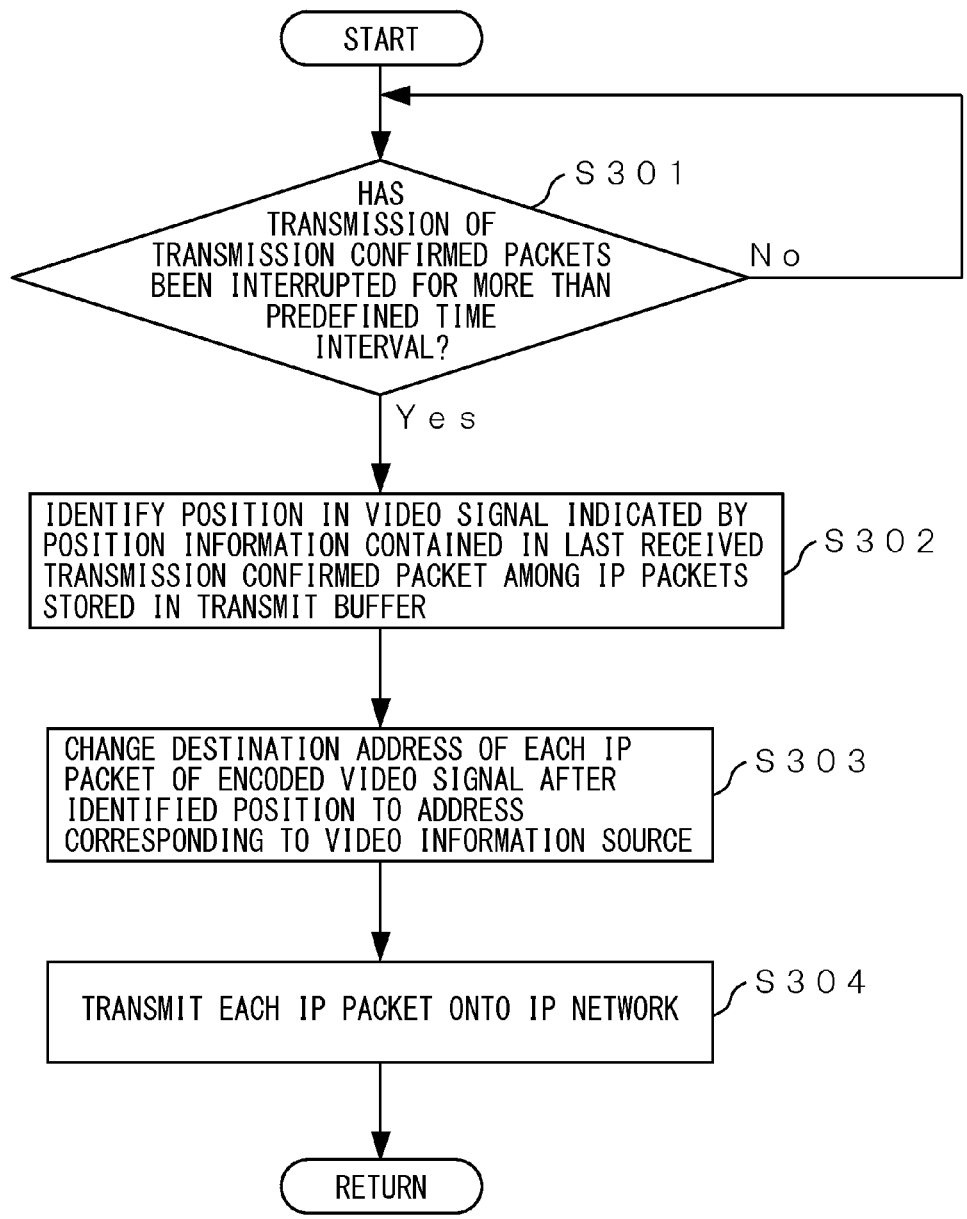
FIG. 12 is an operation flowchart illustrating a failure detection and video signal path switching process performed by a control unit in the working encoder when a failure occurs in the standby encoder that belongs to the same group as the working encoder.

FIG. 12 is an operation flowchart illustrating the failure detection and video signal path switching process performed by the control unit 20 in the working encoder when a failure occurs in the standby encoder that belongs to the same group as the working encoder.

The control unit 20 determines whether or not the transmission of transmission confirmed packets from the standby encoder has been interrupted for more than a predefined time interval (step S301). The predefined time interval is set, for example, longer than the transmission interval of IP packets from the standby encoder but shorter than the predetermined period of time during which each IP packet is held in the transmit buffer 151; for example, it is set to 50 msec to 100 msec. If the encoder has received a new transmission confirmed packet within the predefined time interval after receiving the previous transmission confirmed packet (No in step S301), the control unit 20 determines that the standby encoder is functioning normally. Then, the control unit 20 repeats the process of step S301.

On the other hand, if the encoder does not receive a new transmission confirmed packet within the predefined time interval after receiving the previous transmission confirmed packet (Yes in step S301), the control unit 20 determines that a failure has occurred in the standby encoder and the standby encoder has become unable to output the encoded video signal. Then, the control unit 20 identifies the position in the video signal indicated by the position information contained in the last received transmission confirmed packet among the IP packets stored in the transmit buffer 151 (step S302).

The control unit 20 refers to the management table and identifies the destination address corresponding to the video information source of the video signal being encoded by the working encoder. The control unit 20 passes the destination address and the identified position to the transmitting unit 15. The transmitting unit 15 changes the destination address of each IP packet of the encoded video signal following the identified position to the address corresponding to the video information source (step S303). After that, the transmitting unit 15 transmits each IP packet of the encoded video signal after the identified position sequentially onto the IP network 6 (step S304). Thus, in the encoding system 1, if the standby encoder fails, the working encoder can be made to replace the failed standby encoder and output each IP packet of the encoded video signal after the failed position. In this way, if the standby encoder fails, the encoding system 1 can prevent the output of the video signal via the standby encoder from being interrupted.

Next, a description will be given of the video signal path switching to be effected when a failed encoder is restored.

Figure 13:
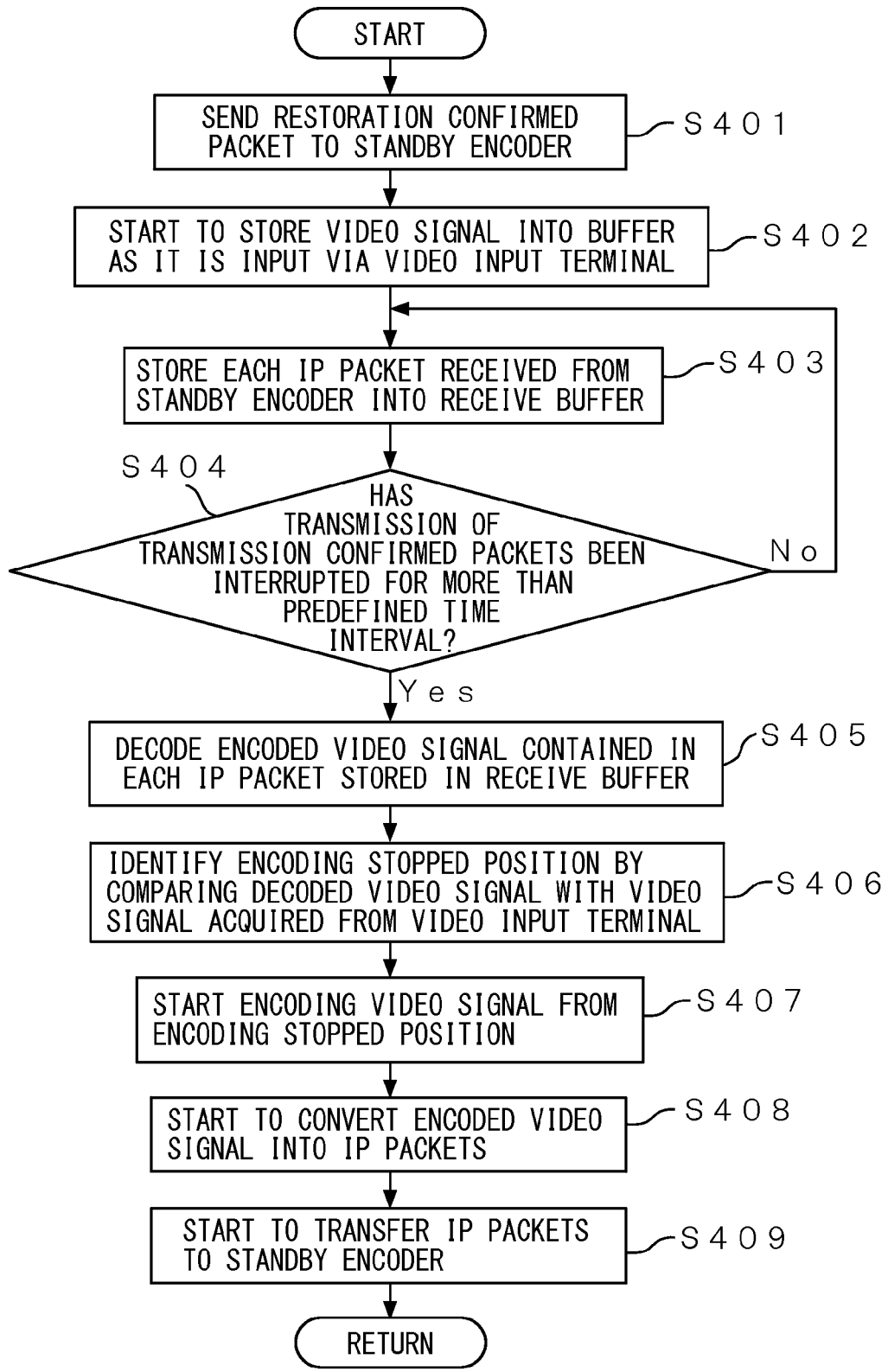
FIG. 13 is an operation flowchart illustrating a path switching process performed when a failed working encoder is restored.

FIG. 13 is an operation flowchart illustrating the path switching process performed when a failed working encoder is restored. The restored working encoder sends a restoration confirmed packet as one example of a control packet to the standby encoder (step S401). The restoration confirmed packet carries, for example, the IP address of the restored encoder as control information. The control unit 20 in the restored working encoder starts to store the video signal into the buffer as it is input via the video input terminal from the video information source of the video signal that the encoder was encoding until the occurrence of the failure (step S402).

On the other hand, the standby encoder that received the restoration confirmed packet starts to transfer the IP packet containing the encoded video signal to the restored working encoder as well as to the IP network 6. Further, the standby encoder starts to transmit the transmission confirmation packet to the restored working encoder.

The receiving unit 17 in the restored encoder stores each IP packet into the receive buffer 171 as it is received from the standby encoder (step S403). After that, the control unit 20 in the restored encoder determines whether or not the transmission of transmission confirmed packets from the standby encoder has been interrupted for more than a predefined time interval (step S404). The process of steps S403 and S404 is repeated as long as the transmission confirmed packet is received.

When a predetermined allowed time has elapsed from the reception of the transmission confirmed packet, the standby encoder stops encoding the video signal and stops transferring the IP packet containing the encoded video signal to the IP network 6 and the restored encoder. Further, the standby encoder, after transmitting out the last packet containing the video signal encoded by itself, stops transmitting out the transmission confirmed packet.

On the other hand, in the restored encoder, if no transmission confirmed packet has been received within the predefined time interval after receiving the previous transmission confirmed packet (Yes in step S404), the control unit 20 determines that the standby encoder has stopped encoding the video signal. The control unit 20 then causes the encoded video signal contained in each IP packet stored in the receive buffer 171 to be output to the decoding unit 18. The decoding unit 18 decodes the received encoded video signal (step S405). The decoding unit 18 passes the decoded video signal to the control unit 20.

The control unit 20 in the restored encoder identifies the position at which the standby encoder stopped encoding, by comparing the decoded video signal with the video signal acquired from the video input terminal and stored in the buffer (step S406). The control unit 20 can identify the encoding stopped position by performing the same processing as the processing that the standby encoder performs to identify the encoding interrupted position in the event of failure of the working encoder.

The control unit 20 in the restored encoder causes the video signal after the identified encoding stopped position to be output from the buffer via the selector 13 to the encoding unit 14. The encoding unit 14 then starts encoding the video signal from the encoding stopped position (step S407). The encoding unit 14 passes the encoded video signal to the transmitting unit 15. The transmitting unit 15 starts to convert the received encoded video signal into IP packets (step S408). At this time, the transmitting unit 15 sets the destination address of each IP packet to the address of the standby encoder. Then, the transmitting unit 15 starts to transfer the IP packets to the standby encoder (step S409). In this way, when the working encoder is restored, the restored working encoder can take over the encoding of the video signal from the standby encoder without causing any dropouts in the video signal being transmitted out on the IP network 6.

Figure 14:
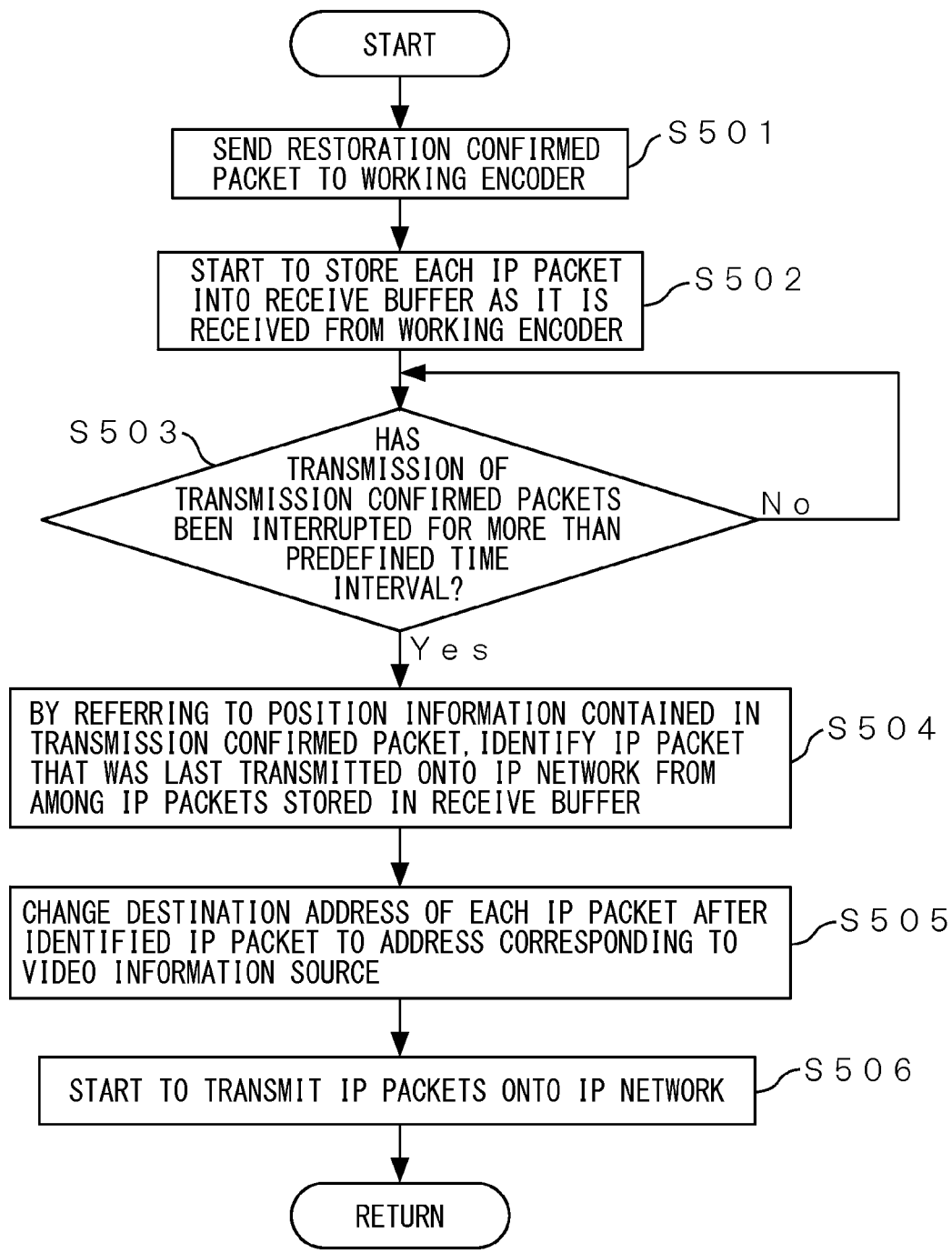
FIG. 14 is an operation flowchart illustrating a path switching process performed when a failed standby encoder is restored.

FIG. 14 is an operation flowchart illustrating the path switching process performed when a failed standby encoder is restored. The restored standby encoder sends a restoration confirmed packet to the working encoder (step S501). The working encoder that received the restoration confirmed packet transfers the IP packet containing the encoded video signal not only to the IP network 6 but also to the restored standby encoder. The working encoder also transmits the transmission confirmation packet to the standby encoder. When a predetermined allowed time has elapsed from the transmission of the IP packet to the standby encoder, the working encoder stops transferring the IP packet containing the encoded video signal to the IP network 6. Upon stopping the transmission, the working encoder does not transmit out the transmission confirmed packet for any IP packet generated later than the last packet transmitted out on the IP network 6 without passing through the standby encoder.

On the other hand, in the restored standby encoder, the receiving unit 17 starts to store each IP packet into the receive buffer 171 as it is received from the working encoder (step S502). Then, the control unit 20 in the restored encoder determines whether or not the transmission of transmission confirmed packets from the working encoder has been interrupted for more than a predefined time interval (step S503). The process of step S503 is repeated as long as the transmission confirmed packet is received.

In the restored encoder, if no transmission confirmed packet has been received within the predefined time interval after receiving the previous transmission confirmed packet (Yes in step S503), the control unit 20 determines that the working encoder has stopped transferring IP packets to the IP network 6. Then, by referring to the position information contained in the last received transmission confirmed packet, the control unit 20 identifies, from among the IP packets stored in the receive buffer, the IP packet that was last transmitted from the working encoder onto the IP network 6 (step S504). The control unit 20 indicates the identified IP packet to the receiving unit 17, and the receiving unit 17 sequentially outputs the IP packets after that identified IP packet to the transmitting unit 15. The transmitting unit 15 in the restored encoder changes the destination address of each IP packet following the identified IP packet to the address corresponding to the video information source (step S505). After that, the transmitting unit 15 starts to transmit the IP packets onto the IP network 6 (step S506).

In this way, when the standby encoder is restored, the restored standby encoder can take over the task of transmitting the video signal onto the IP network from the working encoder without causing any dropouts in the video signal being transmitted out on the IP network 6.

With the above-described video signal path switching effected at the time of occurrence of failure or at the time of restoration from failure, the encoding system 1 can switch the video signal path without causing any dropouts in the video signal being transmitted out on the IP network 6. Furthermore, when a failure occurs in one of the encoders, the encoding system 1 reallocates the encoders so that the video signal can be transmitted out on the IP network without any dropouts even when a failure also occurs in another one of the encoders.

Figure 15:
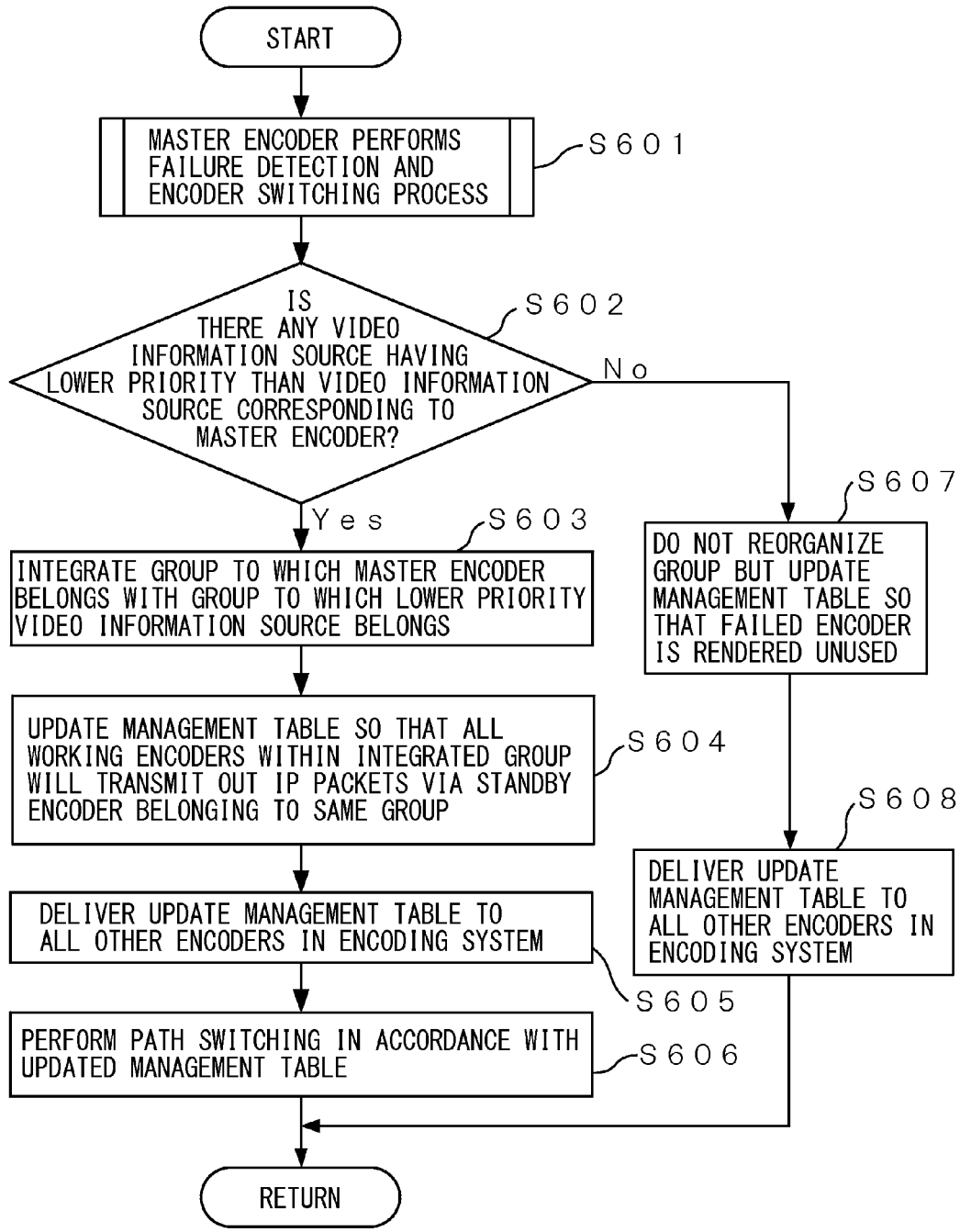
FIG. 15 is an operation flowchart illustrating an encoder reallocation process performed when a failure occurs in one of the encoders.

FIG. 15 is an operation flowchart illustrating the encoder reallocation process performed when a failure occurs in one of the encoders. When a failure occurs in one of the encoders, another encoder belonging to the same group as the failed encoder performs the failure detection and encoder switching process (step S601). For example, when a failure occurs in one of the working encoders, as depicted in FIG. 3, the standby encoder that was receiving IP packets from the working encoder performs the failure detection and encoder switching process in accordance with the operation flow illustrated in FIG. 10. On the other hand, when a failure occurs in one of the standby encoders, as depicted in FIG. 4, the working encoder that was transferring the IP packets to the standby encoder performs the failure detection and encoder switching process in accordance with the operation flow illustrated in FIG. 11. For convenience, the encoder that performs the failure detection and encoder switching process will hereinafter be referred to as the master encoder.

The master encoder then refers to the management table and checks to see if there is any video information source having lower priority than the video information source of the video signal being encoded by the master encoder (step S602). If there is a video information source having lower priority than the video information source of the video signal being encoded by the master encoder (Yes in step S602), the master encoder integrates the group to which it belongs with the group to which the lower priority video information source belongs (step S603). Then, the master encoder updates the management table so that all the working encoders within the integrated group will transmit out the IP packets via the standby encoder belonging to the same group (step S604).

FIG. 16 is a diagram illustrating one example of the management table updated when a failure has occurred in the working encoder 3-1 corresponding to the video information source having relatively high priority, as depicted in FIG. 3. From a comparison between the updated management table 1600 and the management table 900 depicted in FIG. 9, it is seen that all the encoders have been changed to belong to the group "1" and that the encoder 3-6 in the bottom row has been changed to act as the standby encoder for all the video information sources. Further, the encoder status of the encoder 3-1 in the top row has been changed to "2" which indicates the occurrence of failure.

Referring back to FIG. 15, the master encoder generates a control packet containing the updated management table, and delivers the control packet to all the other encoders in the encoding system 1 via the switching hub 4 (step S605). All the encoders perform path switching in accordance with the updated management table (step S606). In this case, a given encoder and an encoder newly designated to act as the standby encoder for the given encoder can switch the video signal path in accordance with the path switching operation flow illustrated in FIG. 14 for the case where the standby encoder is restored. The encoder that acts as the standby encoder corresponds to the restored encoder in the operation flow of FIG. 14.

On the other hand, if, in step S602, there is no video information source having lower priority than the video information source of the video signal being encoded by the master encoder (No in step S602), the master encoder does not reorganize the group. The master encoder updates the management table so that the failed encoder is rendered unused (step S607). Then, the master encoder delivers the updated management table to all the other encoders in the encoding system (step S608).

FIG. 17 is a diagram illustrating one example of the management table updated when a failure has occurred in the working encoder 3-3 corresponding to the video information source having relatively low priority. From a comparison between the updated management table 1700 and the management table 900 depicted in FIG. 9, it is seen that the encoder status of the encoder in row 1701 has been changed to "2" which indicates the occurrence of failure. Further, the encoder 3-6 in the bottom row has been changed to act as a working encoder.

After step S606 or S608, the encoding system 1 terminates the reallocation process.

There are cases where only one standby encoder is provided for a plurality of working encoders. In such cases, if a failure occurs in the standby encoder, each of the plurality of working encoders can independently detect the failure of the standby encoder. Therefore, in this case, a predesignated one of the plurality of working encoders acts as the standby encoder and performs the process of steps S601 to S608. The other encoders that detected the failure need only perform the failure detection and path switching process of step S601.

As has been described above, when a failure occurs in one of the encoders, the encoding system reallocates the unfailed encoders so that the video signal that was being encoded by the failed encoder is routed through working and standby encoders. Accordingly, the encoding system can transmit out the video signal on the IP network without any dropouts even when a failure also occurs in another one of the encoders. Furthermore, in the encoding system, since the standby encoder can handle a plurality of video signals, the number of encoders can be reduced to less than twice the number of video information sources provided to supply the video signals. Further, in the encoding system, the encoder that detected the occurrence of failure updates the management table and, in accordance with the updated management table, autonomously switches the path for the video signals to be handled by the respective encoders. As a result, the encoding system does not require, in addition to the encoders, any external device such as a network management device that manages the connections between the encoders. The encoding system can reduce the overall cost of the system.

According to a modified example, priority may not be set among the video information sources. In that case, the encoder that detected the occurrence of failure (the master encoder in the above case) may integrate the group to which the master encoder belongs with another group encoding the video signal from another video information source so that every video signal will be routed through working and standby encoders. Then, the master encoder may update the management table so that all the working encoders within the integrated group will transmit out the IP packets via the standby encoder belonging to the same group.

According to another modified example, each encoder may be adapted to encode an audio signal supplied from a corresponding one of a plurality of audio sources. The audio signal is another example of the signal having continuity. In this case, each encoder encodes the audio signal in accordance with a coding standard such as MPEG-2 AAC or MPEG-4 AAC. In this example also, the control unit in each encoder decodes the encoded audio signal carried in the IP packet received from another encoder, in order to identify the position within the audio signal at which the encoding was interrupted or stopped due to encoder failure, etc. Then, the control unit calculates, at staggered intervals of time, the cross-correlation value between the decoded audio signal and the audio signal acquired via the matrix switch from the audio source and stored in the buffer. The control unit determines that the position of the endpoint of the decoded audio signal that maximizes the cross-correlation value is the position at which the encoding was interrupted or stopped.

According to still another modified example, each encoder may encode the audio signal supplied along with the video signal from the video information source. In this case, each encoder may assemble a portion of the encoded video signal and a portion of the encoded audio signal into one IP packet.

According to yet another modified example, the router may be used in place of the switching hub to transfer the IP packets or the control packets such as the transmission confirmed packet between the encoders. In this case, the switching hub is omitted.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of superiority and inferiority of the invention. Although the embodiments of the present invention have been described in detail, it should be understood that the various changes, substitutions, and alterations could be made hereto without departing from the spirit and scope of the invention.

What is claimed is:

1. An encoding system which encodes signals having continuity supplied from a plurality of information sources and transmits the encoded signals onto a communication network, comprising:
   each of a plurality of encoders configured to encode a corresponding one of the signals and generate a packet containing a portion of the encoded signal, where the signals are at least one of video signals and audio signals;
   a matrix switch configured to direct the signals from the plurality of information sources to each of the plurality of encoders; and
   a network switch configured to transfer the packet output from any one of the plurality of encoders to another one of the plurality of encoders or to the communication network, wherein:
   the plurality of encoders are each classified as a first encoder which encodes the signal supplied from one of the plurality of information sources, or a second encoder which receives via the network switch the packet output from at least one of the first encoders and transfers the packet to the communication network and which, in the event of failure of one of the first encoders, replaces the failed first encoder, generates the packet by encoding the signal to be encoded by the failed first encoder, and transmits the packet via the network switch onto the communication network;
   when a failure occurs in either one of the first and second encoders through which the signal from a designated one of the plurality of information sources is routed, and the occurrence of the failure is detected by the other of the first and second encoders, the other encoder reallocates the plurality of encoders other than the failed encoder so as to act as the first encoder or second encoder for the respective ones of the plurality of information sources, and notifies each of the plurality of encoders of a result of the reallocation; and
   each of the plurality of encoders is set in accordance with the result of the reallocation to act as the first encoder or the second encoder for the signal supplied from one of the plurality of information sources.

2. The encoding system according to claim 1, wherein the number of the plurality of encoder is larger by two or more than the number of the plurality of information sources but smaller than twice the number of the plurality of information sources, and wherein
   at least one of the second encoders transfers the packets from a plurality of the first encoders onto the communication network.

3. The encoding system according to claim 1, wherein the other encoder that detected the occurrence of the failure reallocates the plurality of encoders other than the failed encoder so that the signal originally routed through the failed encoder will likewise be routed through the first and second encoders.

4. The encoding system according to claim 1, wherein priority is set among the plurality of information sources, and wherein the other encoder that detected the occurrence of the failure reallocates the plurality of encoders so that the second encoder used for the information source having lower priority than the information source that supplies a first signal originally routed through the failed encoder will also be used as the second encoder for the first signal.

5. The encoding system according to claim 1, wherein the second encoder includes a control circuit which, when no packet is received within a first time interval from the first encoder, then determines that a failure has occurred in the first encoder.

6. The encoding system according to claim 5, wherein the second encoder further includes:
   a first memory configured to, each time the packet is received from the first encoder, store the received packet for the duration of a second time interval which is longer than the first time interval;
   an input terminal configured to acquire via the matrix switch the signal to be encoded by the first encoder;
   a second memory configured to store the signal acquired via the input terminal for the duration of a third time interval which is longer than the first time interval;
   a decoding circuit configured to, when it is determined that a failure has occurred in the first encoder, decode the encoded signal contained in the packet stored in the first memory; and
   an encoding circuit configured to encode at least a portion of the signal stored in the second memory,
   wherein by comparing the decoded signal with the signal stored in the second memory, the control circuit identifies a position within the signal at which is located a portion last encoded before the occurrence of the failure of the first encoder, and causes the encoding circuit to encode the signal stored in the second memory, starting from a portion that immediately follows the identified position.

7. An encoder reallocation method for use in an encoding system including encoders, comprising:
   encoding, by each of the encoders, a signal, representing at least one of video and audio and having continuity supplied from a corresponding one of a plurality of information sources, to generate a packet containing a portion of an encoded signal;
   directing, by a matrix switch, signal from each of the plurality of information sources to each of the encoders;
   transferring, by a network switch the packet output from any one of the encoders to another encoder among the encoders or to a communication network;
   classifying each of the encoders as one of a first encoder which encodes the signal supplied from one of the plurality of information sources, and a second encoder which receives via the network switch the packet output from at least one first encoder and transfers the packet to the communication network and which, upon detection of a failed first encoder among the at least one first encoder, replaces the failed first encoder, generates the packet by encoding the signal to be encoded by the failed first encoder, and transmits the packet via the network switch onto the communication network, and
   when a failure occurs in a failed encoder among any of the first and second encoders through which the signal from a designated one of the plurality of information sources is routed,
      detecting occurrence of the failure by the other encoder among the first and second encoders;
      reallocating, by the other encoder, remaining encoders other than the failed encoder one of the first encoder and the second encoder for the respective ones of the plurality of information sources;
      notifying, by the other encoder, each of the remaining encoders of a result of the reallocating; and
      setting each of the encoders in accordance with the result of the reallocating to act as one of the first encoder and the second encoder for the signal supplied from one of the plurality of information sources.

8. The encoder reallocation method according to claim 7, wherein the reallocating reallocates the remaining encoders so that the signal originally routed through the failed encoder will be routed through the first and second encoders.

9. The encoder reallocation method according to claim 7, wherein priority is set among the plurality of information sources, and
   wherein the reallocating reallocates the remaining encoders so that the second encoder used for the information source having lower priority than the information source that supplies a first signal originally routed through the failed encoder will be used as the second encoder for the first signal.

* * * * *